US008648840B2

(12) United States Patent
Uchino et al.

(10) Patent No.: US 8,648,840 B2
(45) Date of Patent: Feb. 11, 2014

(54) DISPLAY APPARATUS, DRIVING METHOD THEREOF, AND ELECTRONIC SYSTEM

(75) Inventors: Katsuhide Uchino, Kanagawa (JP); Tetsuro Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1122 days.

(21) Appl. No.: 12/073,861

(22) Filed: Mar. 11, 2008

(65) Prior Publication Data

US 2008/0225026 A1 Sep. 18, 2008

(30) Foreign Application Priority Data

Mar. 15, 2007 (JP) ................................ 2007-067005

(51) Int. Cl.
*G06F 3/038* (2013.01)

(52) U.S. Cl.
USPC .................. 345/204; 345/87; 345/88; 345/95

(58) Field of Classification Search
None
See application file for complete search history.

(56) References Cited

U.S. PATENT DOCUMENTS

| | | | | |
|---|---|---|---|---|
| 5,751,279 | A * | 5/1998 | Okumura | 345/212 |
| 2006/0071884 | A1* | 4/2006 | Kim | 345/76 |
| 2006/0125740 | A1* | 6/2006 | Shirasaki et al. | 345/77 |
| 2006/0170628 | A1* | 8/2006 | Yamashita et al. | 345/76 |

FOREIGN PATENT DOCUMENTS

| | | |
|---|---|---|
| JP | 2003-216110 A | 7/2003 |
| JP | 2003-255856 | 9/2003 |
| JP | 2003-255897 A | 9/2003 |
| JP | 2003-271095 | 9/2003 |
| JP | 2004-029791 | 1/2004 |
| JP | 2004-093682 | 3/2004 |
| JP | 2004-133240 | 4/2004 |
| JP | 2005-258326 A | 9/2005 |
| JP | 2005-331900 A | 12/2005 |
| JP | 2006-053539 A | 2/2006 |

OTHER PUBLICATIONS

Japanese Office Action issued Dec. 20, 2011 for corresponding Japanese Application No. 2007-067005.

Japanese Office Action issued Oct. 16, 2012 for corresponding Japanese Application No. 2007-067005.

* cited by examiner

*Primary Examiner* — Sumati Lefkowitz
*Assistant Examiner* — Jesus Hernandez
(74) *Attorney, Agent, or Firm* — Rader, Fishman & Grauer PLLC

(57) ABSTRACT

A display apparatus includes: a pixel array section including a row of first and second scanning lines, a column of signal lines, and pixels in a matrix, each of the pixels disposed at an intersection of both of the lines; and a drive section. The drive section performs line progressive scanning on the pixels. The pixel includes a light emitting device, a sampling transistor, a driving transistor, a switching transistor, and a holding capacitor. The sampling transistor samples a video signal on the signal line to hold the signal potential in the holding capacitor, the driving transistor makes the light emitting device conductive to be in a luminous state in accordance with the held signal potential, and the switching transistor becomes ON in accordance with the control signal supplied in advance of the sampling of the video signal to change the light emitting device to a non-luminous state.

9 Claims, 15 Drawing Sheets

(1)

(2)

(4)

(5)

(6)

(7)

DISPLAY APPARATUS, DRIVING METHOD THEREOF, AND ELECTRONIC SYSTEM

CROSS REFERENCES TO RELATED APPLICATIONS

The present invention contains subject matter related to Japanese Patent Application JP 2007-067005 filed in the Japanese Patent Office on Mar. 15, 2007, the entire contents of which are incorporated herein by reference.

BACKGROUND OF THE INVENTION

1. Field of the Invention

The present invention relates to an active-matrix display apparatus using light emitting devices as pixels and a method of driving the apparatus. Also, the present invention relates to an electronic system including such a display apparatus.

2. Description of the Related Art

In recent years, light-emitting flat display apparatuses using organic EL devices as light-emitting devices have been widely developed. The organic EL device is a device using a phenomenon in which an organic thin film emits light when an electric field is impressed on the film. The organic EL device is a low-power consumption device, because the device is driven by applying a voltage of 10 V or less. Also, the organic EL device is a self-emitting device emitting light by itself, and thus needs no lighting member, making it easy to save weight and to reduce thickness. Furthermore, the organic EL device has a very high response speed of about a few μ seconds, and thus has no afterimage at the time of displaying moving images.

Among the light-emitting flat display apparatuses using organic EL devices as pixels, in particular, active-matrix display apparatuses formed by the integration of thin-film transistors for individual pixels as driving devices are widely developed. The light-emitting flat display apparatuses of an active-matrix type have been disclosed, for example, in Japanese Unexamined Patent Application Publication Nos. 2003-255856, 2003-271095, 2004-133240, 2004-029791, 2004-093682.

FIG. 20 is a circuit diagram schematically illustrating an example of an active-matrix display apparatus of the related art. The display apparatus includes a pixel array section 1 and a surrounding drive section. The drive section includes a horizontal selector 3 and a write scanner 4. The pixel array section 1 includes a column of signal lines SL and a row of scanning lines WS. Pixels 2 are disposed at intersections of individual signal lines SL and scanning lines WS. In the figure, in order to make it easy for understanding, only one pixel 2 is shown. The write scanner 4 includes a shift register, operates in response to a clock signal ck supplied from the outside, and transfers a start pulse sp, which is also supplied from the outside, in sequence, and thus outputs a control signal onto the scanning line WS in sequence. The horizontal selector 3 supplies a video signal onto the signal lines SL in accordance with line progressive scanning of the write scanner 4.

The pixel 2 includes a sampling transistor T1, a driving transistor T2, a holding capacitor C1, and a light emitting device EL. The driving transistor T2 is a P-channel type, the source thereof is connected to a power source line, and the drain thereof is connected to a light-emitting device EL. The gate of the driving transistor T2 is connected to the signal line SL through the sampling transistor T1. The sampling transistor T1 becomes conductive in response to the control signal supplied from the write scanner 4, samples the video signal supplied from the signal line SL to write the signal into a holding capacitor C1. The driving transistor T2 receives the video signal written in the holding capacitor C1 as a gate voltage Vgs, and causes a drain current Ids to flow to the light emitting device EL. Thereby, the light emitting device EL emits light at a luminance in accordance with the video signal. The gate voltage Vgs indicates the gate potential in reference to the source.

The driving transistor T2 operates in a saturation region, and a relationship between the gate voltage Vgs and the drain current Ids is expressed by the following characteristic expression:

$$Ids=(1/2)\mu(W/L)\mathrm{Cox}(Vgs-Vth)^2$$

where μ represents the mobility of the driving transistor, W represents the channel width of the driving transistor, L represents the channel length of the driving transistor, Cox represents the gate capacitance of the driving transistor, and Vth represents the threshold voltage of the driving transistor. As is apparent from this characteristic expression, when the driving transistor T2 operates in the saturation region, the driving transistor T2 functions as a constant current source supplying the drain current Ids in accordance with the gate voltage Vgs.

FIG. 21 is a graph showing a voltage/current characteristic of the light emitting device EL. An anode voltage V is shown on the horizontal axis and the drive current Ids is shown on the vertical axis. In this regard, the anode voltage of the light emitting device EL is the drain voltage of the driving transistor T2. The voltage/current characteristic of the light emitting device EL changes over time, and the characteristic curve has a tendency of falling down with the elapse of time. Thus, even if the drive current Ids is constant, the anode voltage (drain voltage) V changes. On this point, in the pixel circuit 2 shown in FIG. 20, the driving transistor T2 operates in a saturation region, and thus allows the drive current Ids to flow in accordance with the gate voltage Vgs regardless of variations of the drain voltage. Accordingly, it is possible to keep the luminance of the light emission by the light emitting device EL at a constant regardless of a change in the characteristic of the light emitting device EL over time.

FIG. 22 is a circuit diagram illustrating another example of a pixel circuit of the related art. The different point from the pixel circuit of FIG. 20 shown before is that the driving transistor T2 has changed from a P-channel type to an N-channel type. It is often advantageous that all the transistors included in a pixel should be a N-channel type in view of the manufacturing process of the circuit.

SUMMARY OF THE INVENTION

However, in the circuit configuration of FIG. 22, the driving transistor T2 is a N-channel type, and thus its drain is connected to a power source line, whereas its source S is connected to the anode of the light emitting device EL. Accordingly, if the characteristic of the light emitting device EL changes over time, the potential of the source S is affected, thus Vgs changes, and the drain current Ids supplied by the driving transistor T2 changes over time. Thus, there is a problem in that the luminance of the light emitting device EL changes over time.

Also, the threshold voltage Vth and the mobility μ of the driving transistor T2 vary for each pixel. These parameters μ and Vth are included in the transistor characteristic expression described above, and thus Ids changes even if Vgs is constant. Thus, the luminance of the light emission changes for each pixel, causing a problem to be solved.

In view of the above-described problems of the related art, it is desirable to provide a display apparatus having a uniform luminance of the light emission without being affected by the characteristic variations of a light emitting device, the variations of the threshold voltage and the mobility of a driving transistor, etc. According to an embodiment of the present invention, there is provided a display apparatus including: a pixel array section; and a drive section driving the pixel array section; wherein the pixel array section includes a row of first scanning lines and second scanning lines, a column of signal lines, and pixels in a matrix, each of the pixels disposed at an intersection of each of the first scanning lines and each of the signal lines, and wherein the drive section outputs control signals to the row of first scanning lines and second scanning lines, respectively, to perform line progressive scanning on the pixels for each row, and supplies a signal potential of a video signal and a reference potential to a column of signal lines in synchronism with the line progressive scanning, the pixel includes a light emitting device, a sampling transistor, a driving transistor, a switching transistor, and a holding capacitor, the sampling transistor has a control terminal connected to the first scanning line and a pair of current terminals, one of the current terminals is connected to the signal line, and the other of the current terminals is connected to a control terminal of the driving transistor, the driving transistor has a pair of current terminals, one of the current terminals is connected to a power source line, and the other of the current terminals is connected to the light emitting device, the switching transistor has a control terminal connected to the second scanning line and a pair of current terminals, one of the current terminals is connected to a fixed potential, and the other of the current terminals is connected to the other of the current terminals of the driving transistor, and the holding capacitor has one terminal connected to the control terminal of the driving transistor and the other terminal connected to the other of the current terminals of the driving transistor, wherein the sampling transistor passes a current in accordance with the control signal supplied from the first scanning line, and samples a signal potential of a video signal supplied from the signal line to hold the signal potential in the holding capacitor, the driving transistor causes a drive current to flow through the light emitting device to change the device to a luminous state in accordance with the held signal potential supplied by the current from the power source line, and the switching transistor becomes ON in accordance with the control signal supplied from the second scanning signal in advance of the sampling of the video signal to connect the other of the current terminals of the driving transistor to a fixed potential to change the light emitting device to a non-luminous state. In the above-described embodiment, the light emitting device preferably includes an anode and a cathode, the anode is preferably connected to the other of the current terminals of the driving transistor, the cathode is preferably connected to a predetermined cathode potential, and the fixed potential to which one of the current terminals of the switching transistor is connected is preferably set to be lower than the cathode potential. Also, the drive section preferably includes threshold-voltage correction means in order to control the first and the second scanning lines and a signal line to perform a correction operation writing a voltage corresponding to a threshold voltage of the driving transistor included in each pixel into the holding capacitor, thereby canceling variations of the threshold voltage among the pixels. Also, the threshold-voltage correction means preferably repeats the correction operations separately in a plurality of horizontal cycles preceding sampling of the video signal. Also, the threshold-voltage correction means preferably sets the signal line at the reference voltage and preferably turns ON the sampling transistor to set the control terminal of the driving transistor to the reference voltage, at the same time, preferably turns ON the switching transistor to set the other of the current terminals of the driving transistor to a fixed potential lower than the threshold voltage with respect to the reference voltage, and then preferably turns OFF the switching transistor to write a voltage corresponding to the threshold voltage of the driving transistor into the holding capacitor. Also, the control scanner preferably outputs a control signal having a predetermined time width onto the first scanning line in order to make the sampling transistor conductive in a time period when the signal line is at the signal potential, thereby causing the holding capacitor to hold the signal potential and correcting the signal potential for mobility of the driving transistor. Also, the control scanner preferably makes the sampling transistor nonconductive to electrically cut off the control terminal of the driving transistor from the signal line at a point in time when the signal potential is held in the holding capacitor, and thus a potential variation of the control terminal preferably follows a potential variation of the other of the current terminals of the driving transistor, thereby maintaining a voltage between the two terminals so as to be constant.

By the present invention, each pixel includes a switching transistor in addition to the sampling transistor and the driving transistor. The switching transistor is turned ON in response to the control signal supplied from the scanning line prior to the sampling of the video signal to connect the output current terminal of the driving transistor to a fixed potential, thereby changing the light emitting device to a non-luminous state. In this manner, by providing a non-luminous period prior to the sampling of the video signal, it is possible to perform a threshold-voltage correction operation and a mobility correction operation during this period. After the completion of these operations, the light emitting device proceeds to a luminous period to emit light at a luminance in accordance with the video signal. In this manner, in the present invention, the non-luminous period is inserted between the luminous period and the sampling period by controlling the switching transistor, and thus it becomes possible to perform the threshold-voltage correction operation and the mobility correction operation for the driving transistor during this period. In this manner, it is possible to achieve a display apparatus having a uniform luminance of light emission without being affected by the variations of the threshold voltage and the mobility of the driving transistor.

DESCRIPTION OF THE PREFERRED EMBODIMENTS

In the following, a detailed description will be given of embodiments of the present invention with reference to the drawings.

Figure 1:
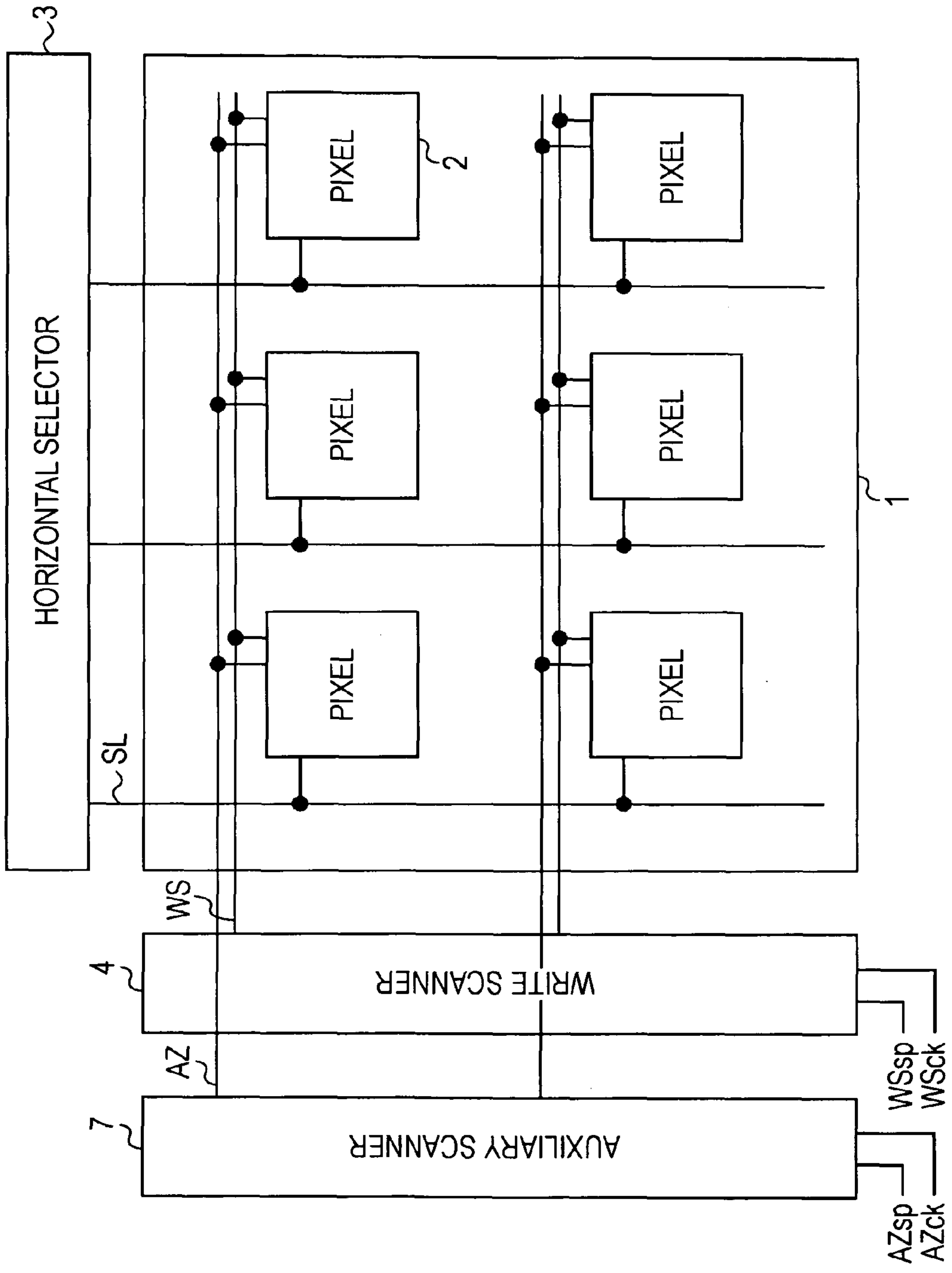
FIG. 1 is a block diagram illustrating an overall configuration of a display apparatus according to the present invention.

FIG. 1 is a block diagram illustrating an overall configuration of a display apparatus according to the present invention. As shown in the figure, the display apparatus basically includes a pixel array section 1 and a drive section driving the pixel array section 1. The pixel array section 1 includes a row of scanning lines WS, a row of scanning lines AZ, a column of signal lines SL, and pixels 2 in a matrix, and each of the pixels is disposed at an intersection of each of the scanning lines WS and each of the signal lines SL. In contrast, the drive section includes a write scanner 4, an auxiliary scanner 7, and a horizontal selector 3. The write scanner 4 outputs a control signal to each of the scanning lines WS to perform line progressive scanning on pixels 2 for each row. The auxiliary scanner 7 also outputs a control signal to each of the scanning lines AZ to perform line progressive scanning on pixels 2 for each row. However, the write scanner 4 and the auxiliary scanner 7 output control signals at different timing. At the same time, the horizontal selector 3 supplies the signal potential of the video signal and a reference voltage to a column of signal lines SL in accordance with the line progressive scanning of the scanners 4 and 7. In this regard, the write scanner 4 includes a shift register, operates in accordance with a clock signal WSck supplied from the outside, and transfers in sequence a start pulse WSsp supplied similarly from the outside, thereby outputting a predetermined control signal to each of the scanning lines WS. The output timing of the control signal is defined by WSck, and the waveform of the control signal is defined by the start pulse WSsp. The auxiliary scanner 7 also includes a shift register, operates in accordance with a clock signal AZck supplied from the outside, and transfers in sequence a start pulse AZsp supplied similarly from the outside, thereby outputting a control signal having a predetermined waveform to each of the scanning lines AZ. The clock signals WSck and Azck have the same cycles, and the scanners 4 and 7 operate at the same timing of the line progressive scanning.

Figure 2:
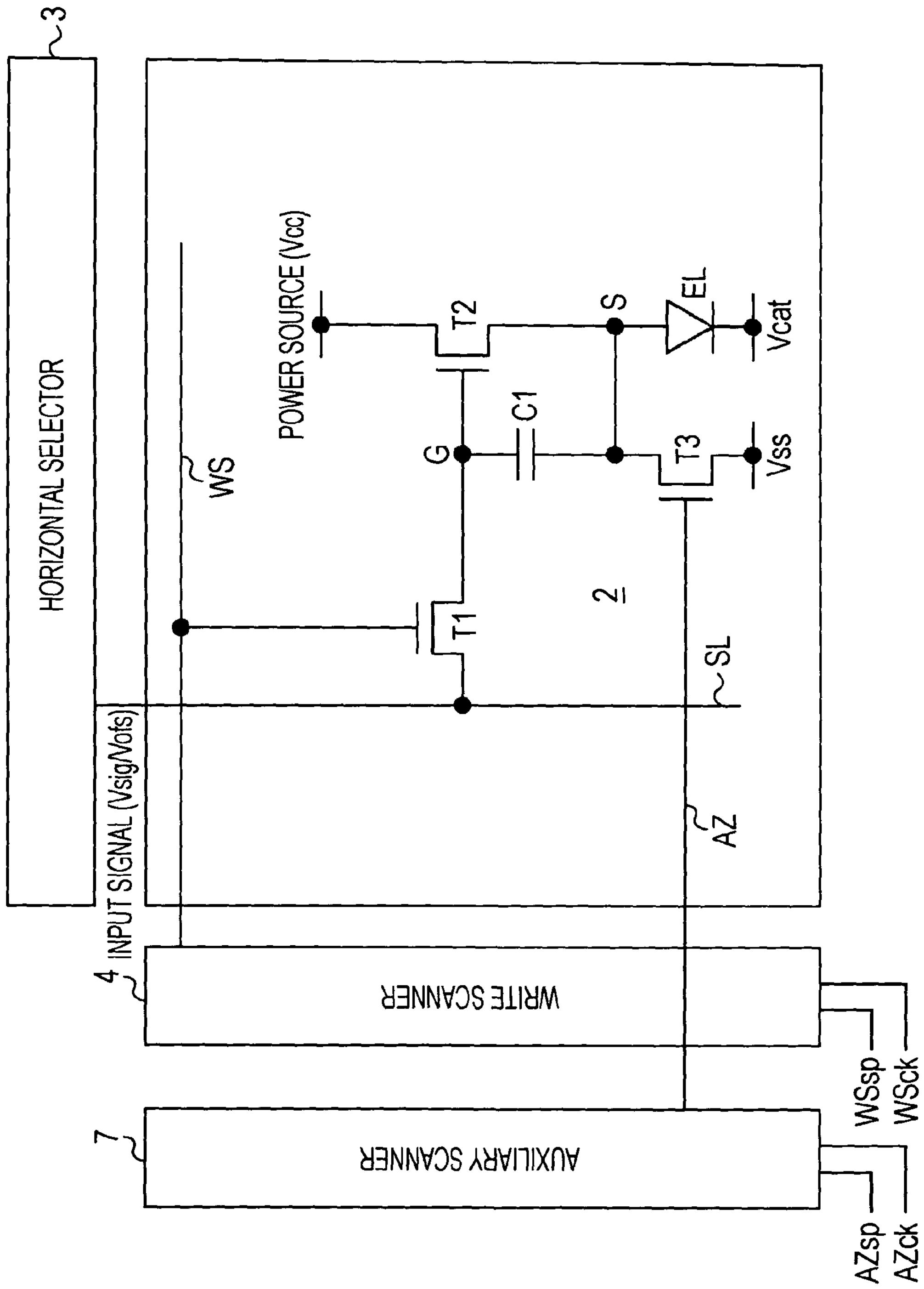
FIG. 2 is a circuit diagram illustrating a configuration of a pixel of the display apparatus according to the present invention.

FIG. 2 is a circuit diagram illustrating a configuration of a pixel 2 incorporated in the display apparatus, shown in FIG. 1, according to the present invention. As shown in the figure, the pixel 2 basically includes a light emitting device EL, a sampling transistor T1, a driving transistor T2, a switching transistor T3, and a holding capacitor C1. The sampling transistor T1 has a control terminal (gate) connected to the scanning line WS and a pair of current terminals (source and drain), and one of the current terminals is connected to the corresponding signal line SL, and the other of the current terminals is connected to a control terminal (gate G) of the driving transistor T2. The driving transistor T2 has a pair of current terminals (source and drain), and one of the current terminals (drain) is connected to the power source line Vcc, and the other of the current terminals (source S) is connected to the anode of the light emitting device EL. The cathode of the light emitting device EL is connected to a predetermined cathode potential Vcat. The switching transistor T3 has a control terminal (gate) connected to the scanning line AZ and a pair of current terminals (source and drain), and one of the current terminals is connected to the fixed potential Vss, and the other of the current terminals is connected to the source S of the driving transistor T2. One terminal of the holding capacitor C1 is connected to the control terminal (gate G) of the driving transistor T2, and the other terminal is connected to the other current terminal (source S) of the driving transistor T2. Thus, the holding capacitor C1 is connected to the fixed potential Vss from the gate G through the switching transistor T3.

In such a configuration, the write scanner 4 in the drive section supplies a control signal for controlling the opening and the closing of the sampling transistor T1 to the scanning lines WS. The auxiliary scanner 7 outputs a control signal for controlling the opening and the closing of the switching transistor T3 to the scanning lines AZ. The horizontal selector 3 supplies a video signal (input signal) changing between the signal potential Vsig and the reference potential Vofs to the signal line SL. In this manner, the potentials of the scanning lines WS and AZ and the signal line SL vary in accordance with the line progressive scanning, but the power source line is fixed at Vcc. Also, the cathode potential Vcat and the fixed potential Vss are also constant.

Next, the summary of the operations is as follows. The sampling transistor T1 passes a current in accordance with the control signal supplied from the first scanning line WS, and samples a signal potential Vsig of the video signal supplied from the signal line SL to hold the signal potential in the holding capacitor C1. The driving transistor T2 receives the supply of a current from the power source line Vcc and causes the drive current to flow to the light emitting device EL in accordance with the signal potential Vsig written in the holding capacitor C1, and changes the light emitting device EL to a luminous state. The switching transistor T3 becomes ON in response to the control signal supplied from the second scanning line AZ prior to the sampling of the video signal, and connects the output current terminal (source S) of the driving transistor T2 to the fixed potential Vss to change the light emitting device EL to a non-luminous state. In this example, the light emitting device EL includes an anode and a cathode, the anode is connected to the output current terminal (source S) of the driving transistor T2, and the cathode is connected to a predetermined cathode potential Vcat. The fixed potential Vss to which one of the current terminals of the switching transistor T3 is connected is set lower than the cathode potential Vcat.

In the display apparatus according to the present invention, a switching transistor T3 is disposed in each pixel circuit 2, and thereby a non-luminous period is inserted prior to the sampling period. By disposing the non-luminous period, it is possible to perform the threshold-voltage correction operation and the mobility correction operation for the driving transistor T2.

In order to perform the above-described threshold-voltage correction operation in each of the pixels 2, the horizontal selector 3, the write scanner 4, and the auxiliary scanner 7 included in the drive section includes threshold-voltage correction means as part of their functions. The threshold-voltage correction means controls the first scanning line WS, the second scanning line AZ, and the signal line SL to perform a correction operation writing a voltage corresponding to the threshold voltage Vth of the driving transistor T2 included in each of the pixels 2 into the holding capacitor C1, thereby canceling variations of the threshold voltage among the pixels 2. In some cases, the threshold-voltage correction means can perform the correction operation repeatedly by dividing the operation into a plurality of horizontal cycles preceding the sampling of the video signal. The threshold-voltage correction means sets the signal line SL at the reference voltage Vofs, and turns ON the sampling transistor T1 to set the control terminal (gate G) of the driving transistor T2 at the reference voltage Vofs. At the same time, the threshold-voltage correction means turns ON the switching transistor T3 to set the output current terminal (source S) of the driving transistor T2 at the fixed potential Vss, which is lower than the threshold voltage Vth with respect to the reference voltage Vofs, and then turns OFF the switching transistor T3 to write a voltage corresponding to the threshold voltage Vth of the driving transistor T2 into the holding capacitor C1.

The control scanner (write scanner) 4 performs the mobility correction operation on each of the pixels 2 during the non-luminous period. In order to make the sampling transistor T1 conductive during the time period in which the signal line SL is at the signal potential Vsig, the write scanner 4 outputs a control signal having a predetermined time width to the first scanning line WS, thereby holding the signal potential in the holding capacitor C1, and at the same time, correcting the signal potential for the mobility $\mu$ of the driving transistor T2. Also, the control scanner (write scanner) 4 makes the sampling transistor T1 nonconductive at a point in time when the signal potential is held in the holding capacitor C1, so that the potential change of the control terminal (gate G) follows the potential change of the output current terminal (source S) of the driving transistor, and thereby controlling a bootstrap operation for maintaining the voltage Vgs of both to be constant.

Figure 3:
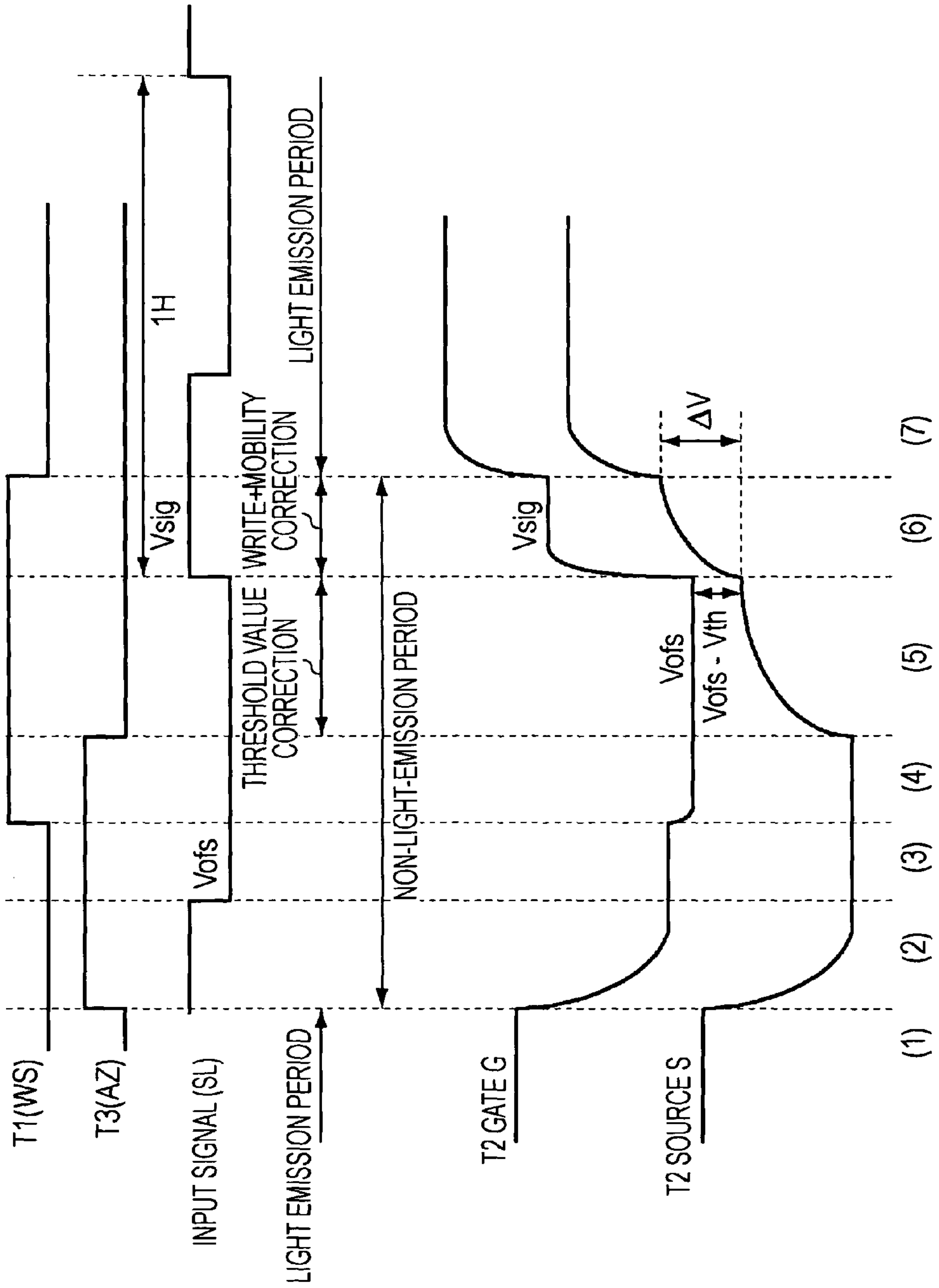
FIG. 3 is a timing chart to be used for explaining operations of the display apparatus according to the present invention.

FIG. 3 is a timing chart to be used for explaining operations of a pixel shown in FIG. 2, according to the present invention. The changes in the potentials of the scanning line WS, the scanning line AZ, and the signal line SL are shown at the same timing on the same time axis. The sampling transistor T1 is a N-channel type, and is turned ON when the scanning line WS becomes a high level. The switching transistor T3 is also a N-channel type, and is turned ON when the scanning line AZ becomes a high level. At the same time, the video signal supplied on the signal line SL changes between the signal potential Vsig and the reference voltage Vofs in one horizontal cycle (1H).

This timing chart shows the changes in the potentials of the gate G and the source S of the driving transistor T2 at the same timing on the same time axis with the changes in the potentials of the scanning line WS, the scanning line AZ, and the signal line SL. The operation state of the driving transistor T2 is controlled in accordance with the potential difference Vgs across the gate G and the source S.

As shown by the timing chart in FIG. 3, the pixel proceeds to non-luminous periods (2) to (6) of the field after the completion of a luminous period (1) of the previous field, and then enters a luminous period (7) of the field. In the non-luminous periods (2) to (6), a reset operation (preparatory operation) of the driving transistor T2, a threshold-voltage correction operation, a signal-potential write operation, a mobility correction operation of the driving transistor T2, and the like are performed. Specifically, in the preparatory periods (2) to (4), the gate of the driving transistor T2 is initialized to the reference potential Vofs, and at the same time, the source S is initialized to the fixed potential Vss. After that, in the threshold-voltage correction period (5), the voltage corresponding to the threshold voltage Vth of the driving transistor T2 is written into the holding capacitor C1 connected across the gate G and the source S. After that, in the write/mobility correction period (6), the writing of the signal potential Vsig and the mobility correction operation of the driving transistor T2 are performed at the same time.

Figure 4:
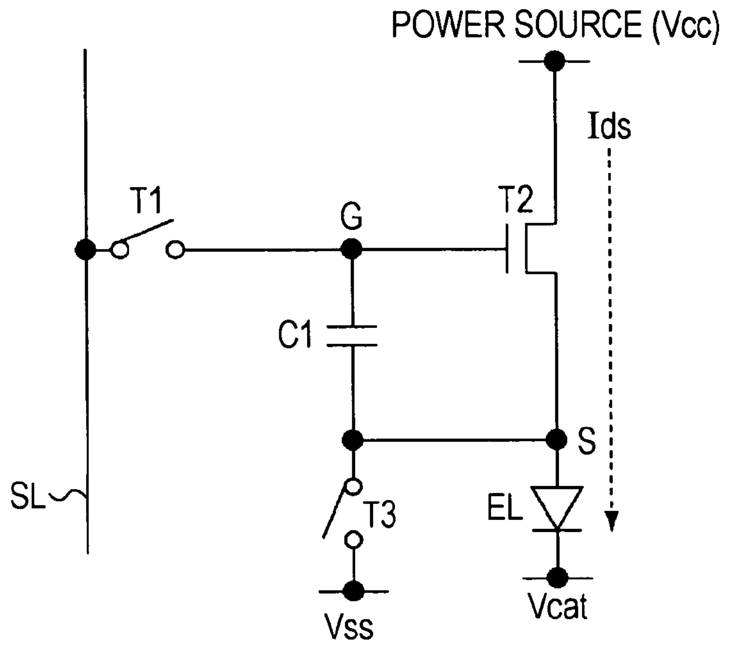
FIG. 4 is a schematic diagram to be used for explaining operations of the pixel according to the present invention.

With reference to FIGS. 4 to 11, a more detailed description will be given of the operation of a pixel circuit shown in FIG. 2, according to the present invention. First, as shown in FIG. 4, in the luminous period (1) of the previous field, the sampling transistor T1 and the switching transistor T3 are in an OFF state. At this time, the driving transistor T2 is set to operate in the saturation region, and thus the driving transistor T2 causes the drive current Ids in response to the gate voltage Vgs to flow to the light emitting device EL in accordance with the above-described transistor characteristic expression.

Figure 5:
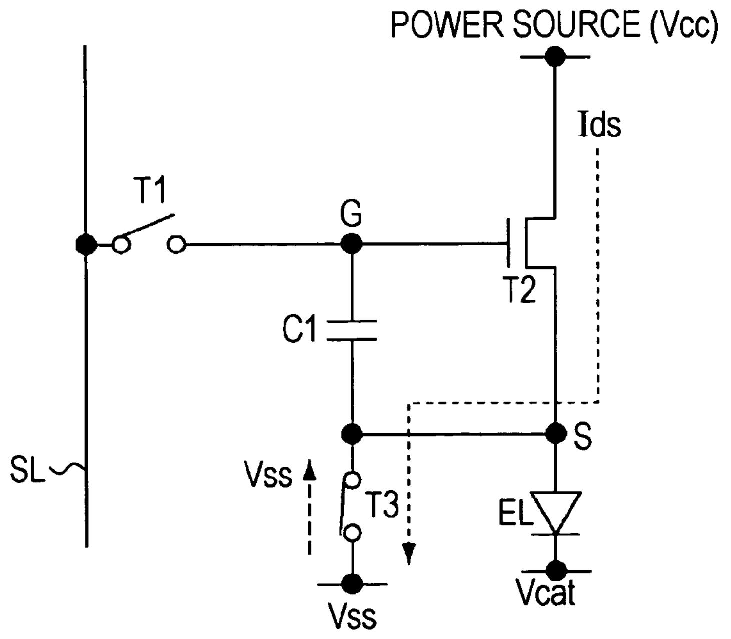
FIG. 5 is also a schematic diagram to be used for explaining the operations.

Next, as shown in FIG. 5, when the state enters the preparatory period (2), the switching transistor T3 is turned ON to set the source S of the driving transistor T2 at the fixed potential Vss. At this time, the fixed potential Vss is set at a lower value than the sum of the threshold voltage Vthel of the light emitting device EL and the cathode potential Vcat. That is to say, Vss is set such that $Vss<Vthel+Vcat$. Thus, the light emitting device EL is in a reverse bias state, thus the drive current Ids does not flow in. Accordingly, the light emitting device EL puts out the light. As shown by a broken line, the output current Ids supplied from the driving transistor T2 flows to the fixed potential Vss through the source S.

Figure 6:
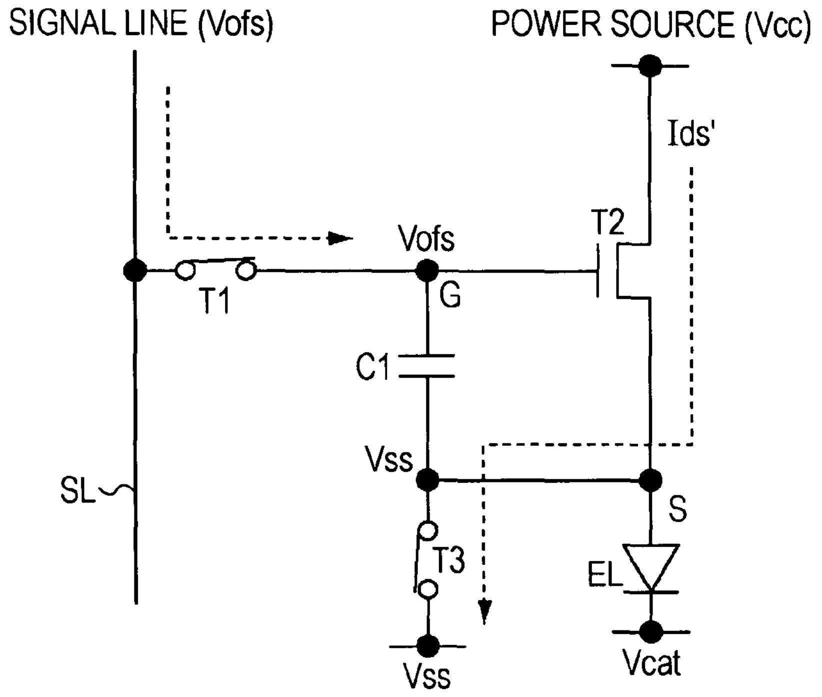
FIG. 6 is also a schematic diagram to be used for explaining the operations.

Next, as shown in FIG. 6, when the state proceeds to the preparatory period (4) through the preparatory period (3), the potential of the signal line SL changes from Vsig to Vofs, and the sampling transistor T1 is turned OFF to set the gate G of the driving transistor T2 at the reference voltage Vofs. At this time, the voltage Vgs across the gate and the source of the driving transistor T2 becomes Vofs−Vss. Here, Vgs is set to satisfy $Vgs=Vofs-Vss>Vth$. If Vofs−Vss is not greater than the threshold voltage Vth of the driving transistor T2, it is not possible to successfully perform the subsequent threshold-voltage correction operation. However, since $Vgs=Vofs-Vss>Vth$, the driving transistor T2 is in an ON state, and thus the drain current Ids' flows from the power source line Vcc to the fixed potential Vss. That is to say, during the preparatory periods (2) to (4), in spite of being in the non-luminous period, a penetration current, which does not contribute to light emission, flows from the power source potential Vcc to the fixed potential Vss in vain. However, the preparatory periods (2) to (4) are necessary in order to initialize the gate G and the source S of the driving transistor T2 in preparation for the threshold-voltage correction operation.

Figure 7:
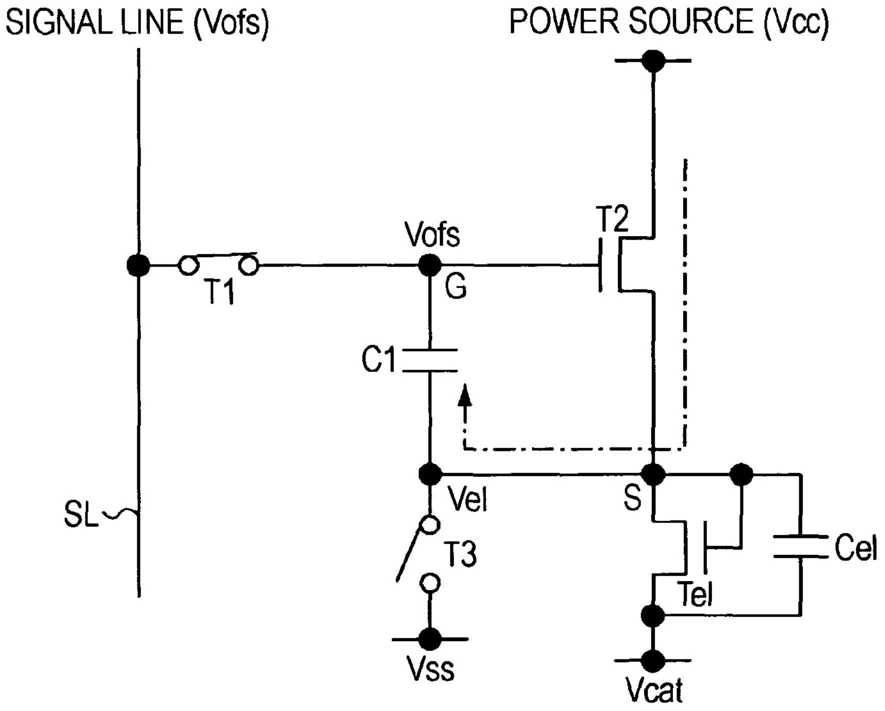
FIG. 7 is also a schematic diagram to be used for explaining the operations.

After this, as shown in FIG. 7, in the threshold-voltage correction period (5), the switching transistor T3 is turned OFF, and thus the source S is cut off from the fixed potential Vss. The equivalent circuit of the light emitting device EL is expressed by a parallel connection of a transistor Tel connected to a diode and an equivalent capacitor Cel as shown in the figure. Here, as long as the potential of the source S (that is to say, the anode potential of the light emitting device) is lower than the sum of the cathode potential Vcat and the threshold voltage Vthel of the light emitting device EL, the light emitting device EL is still in a non-luminous state, and thus only a slight leak current flows. Accordingly, the current supplied from the power source line Vcc through the driving transistor T2 is mostly used for charging the holding capacitor C1 and the equivalent capacitor Cel, as shown by a dash-single-dot line.

Figure 8:
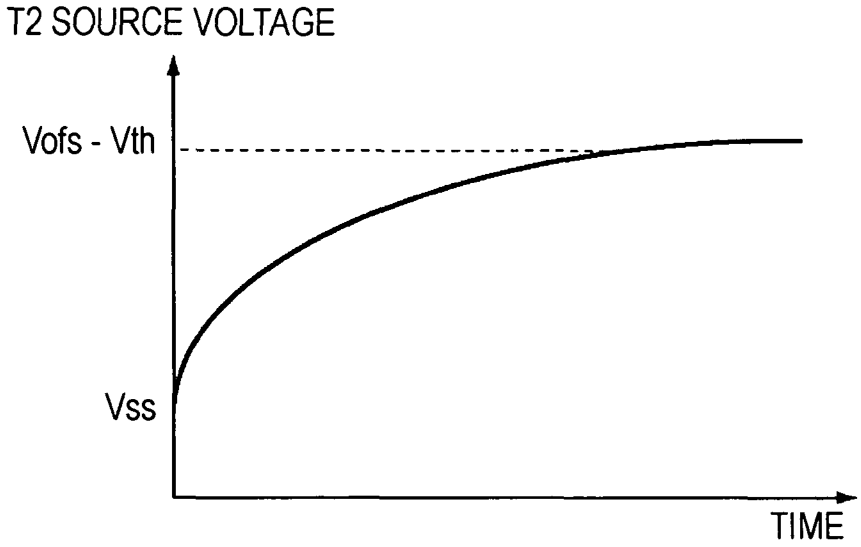
FIG. 8 is a graph to be used for explaining the operations.

FIG. 8 is a graph showing the change of the source voltage of the driving transistor T2 with time in the threshold-voltage correction period (5). As is apparent from the graph, the source potential of the driving transistor T2 increases from the fixed potential Vss with the lapse of time. After a certain time period, the source potential of the driving transistor T2 reaches the level of Vofs−Vth, and thus Vgs becomes equal to Vth. At this point in time, the driving transistor T2 is in cutoff, and the voltage corresponding to Vth is written into the holding capacitor C1 disposed between the source S and the gate G of the driving transistor T2. At the time of the completion of the threshold-voltage correction operation, the source voltage Vofs−Vth is lower than the sum of the cathode potential Vcat and the threshold voltage Vthel of the light emitting device.

Figure 9:
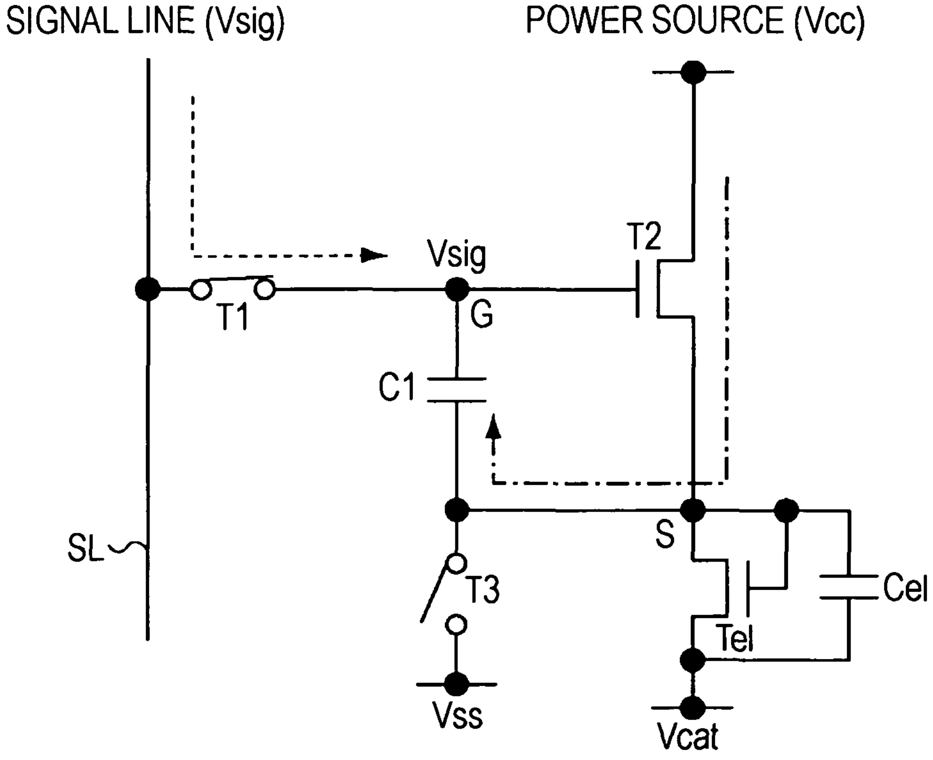
FIG. 9 is also a schematic diagram to be used for explaining the operations.

Next, as shown in FIG. 9, the display apparatus proceeds to a write period/mobility correction period (6), and the signal line SL is changed from the reference potential Vofs to the signal potential Vsig. The signal potential Vsig has become the voltage in accordance with the grayscale. At this point in time, the sampling transistor T1 is ON, and thus the potential of the gate G of the driving transistor T2 becomes Vsig. Thereby, the driving transistor T2 becomes ON, and a current flows from the power-source line Vcc. Thus, the potential of the source S increases with time. At this point in time, if the potential of the source S is still not greater than the sum of the threshold voltage Vthel of the light emitting device EL and the cathode potential Vcat, only a slight leak current flows through the light emitting device EL, and the current supplied from the driving transistor T2 is mostly used for charging the holding capacitor C1 and the equivalent capacitor Cel. In the charging process, the potential of the source S increases as described above.

In this write period (6), the threshold-voltage correction operation of the driving transistor T2 has already been completed, and thus the current supplied from the driving transistor T2 reflects the mobility μ thereof. Specifically, if the mobility μ of the driving transistor T2 is high, the amount of current supplied by the driving transistor T2 becomes large, and thus the potential of the source S increases fast. On the contrary, if the mobility μ is low, the amount of current supplied by the driving transistor T2 is small, and thus an increase in the potential of the source S becomes slow. In this manner, by negatively feeding back the output current of the driving transistor T2 to the holding capacitor C1, the voltage Vgs across the gate G and the source S of the driving transistor T2 reflects the mobility p. After the passage of a certain period time, Vgs becomes the value having a completely corrected mobility μ. That is to say, in the write period (6), the mobility μ of the driving transistor T2 is corrected simultaneously by negatively feeding back the current output from the driving transistor T2 to the holding capacitor C1.

Figure 10:
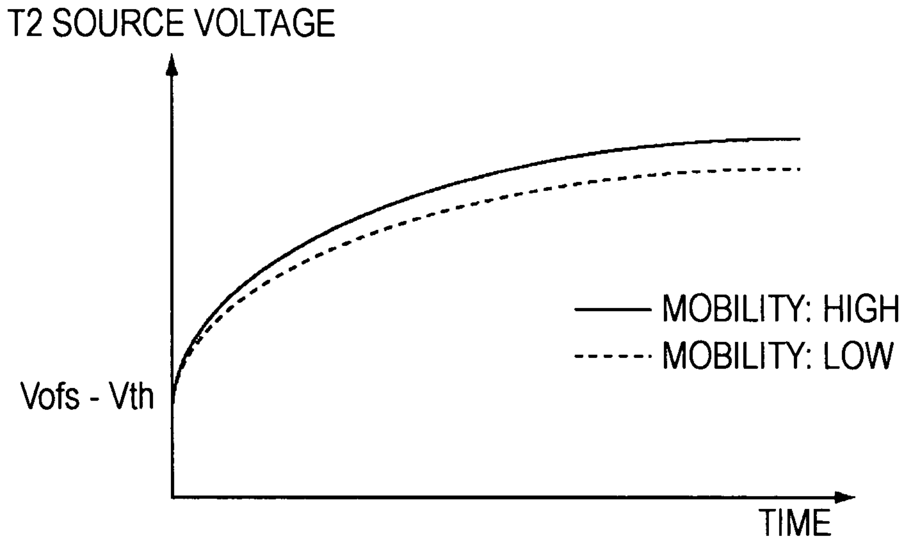
FIG. 10 is also a graph to be used for explaining the operations.

FIG. 10 shows the change of the source voltage of the driving transistor T2 with time in the mobility correction period (6). If the mobility μ is high, as shown by a solid line, the amount of increase of the source voltage of the driving transistor T2 is large, whereas if the mobility μ is low, the amount of increase of the source voltage is small, as shown by a dashed line. To put it another way, the higher the mobility μ is, the compression of Vgs becomes stronger, and thus the current supply power of the driving transistor is more suppressed. On the contrary, the lower the mobility μ is, the stronger compression of Vgs is not applied, and thus there is no adverse effect on the amount of current supply of the driving transistor T2. In this manner, it is possible to correct the variations of the mobility μ of the driving transistor T2.

Figure 11:
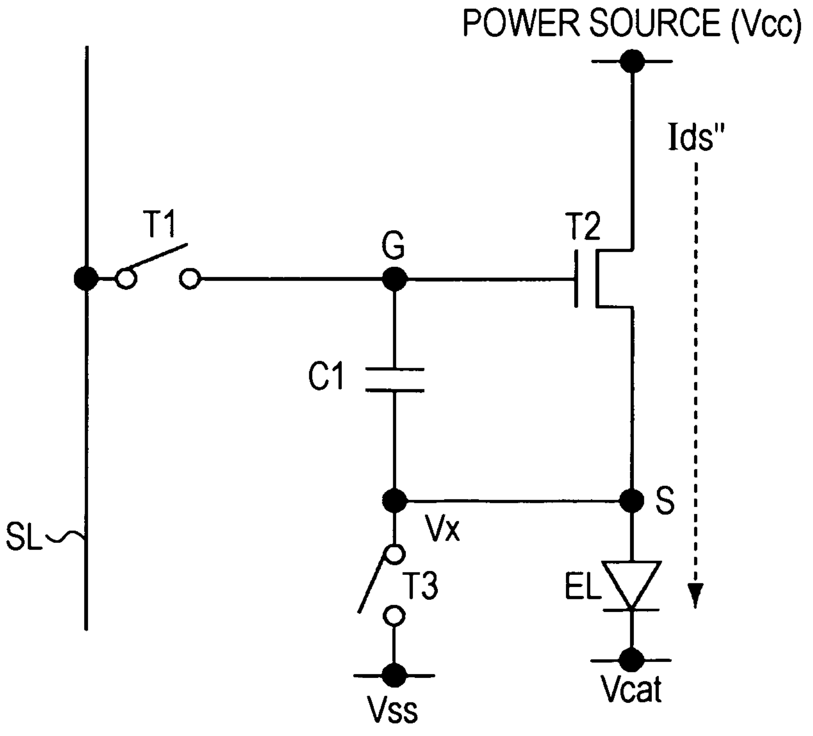
FIG. 11 is also a schematic diagram to be used for explaining the operations.

Finally, as shown in FIG. 11, in the luminous period (7) of the field, the sampling transistor T1 is turned OFF, and the gate G of the driving transistor T2 is cut off from the signal line SL. Thereby, it becomes possible for the potential of the gate G to increase, and thus the potential of the source S increases together with the increase in the potential of the gate G while maintaining the value of the Vgs held in the holding capacitor C1. Thus, the reverse bias state of the light emitting device EL is eliminated, and the driving transistor T2 causes the drain current Ids" in accordance with Vgs to flow to the light emitting device EL. The potential of the source S increases to the voltage Vx until a current Ids" flows to the light emitting device EL, and the light emitting device EL emits light. Here, if the light emitting device EL emits light for a long time, the current/voltage characteristic of the device changes. Thus, the potential of the source S also changes. However, the voltage Vgs across the gate G and the source S of the driving transistor T2 is maintained at a constant value by the bootstrap operation, and thus the current flowing to the light emitting device EL does not change. Accordingly, even if the current/voltage characteristic of the light emitting device EL is deteriorated, a constant current Ids continues to flow constantly, and thus the luminance of the light emitting device EL will not change.

Figure 12:
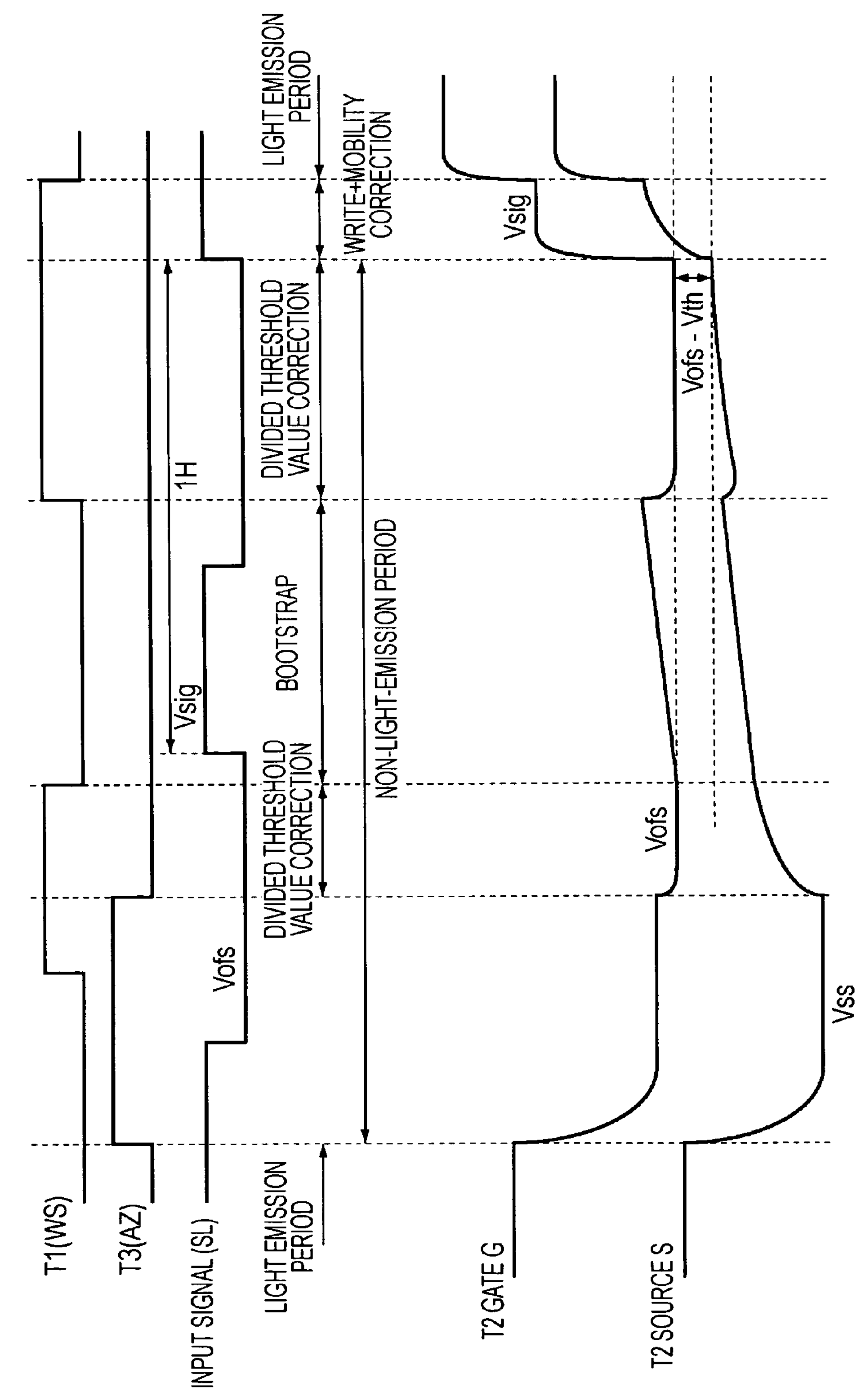
FIG. 12 is a timing chart of a display apparatus according to another embodiment of the present invention.

FIG. 12 is a timing chart of a display apparatus according to another embodiment of the present invention. The circuit configuration of a pixel itself is the same as shown in FIG. 2. However, the control sequence is different from the timing chart of FIG. 3. This embodiment is characterized by the division of the threshold-voltage correction operation. As shown in the figure, after the switching transistor T3 is turned OFF to start the threshold-voltage correction operation, the sampling transistor T1 is turned OFF while the signal line SL is at the reference voltage Vofs. When the sampling transistor T1 is turned OFF, a current flows by the voltage Vgs between the gate and the source of the driving transistor T2 to increase both the gate G potential and the source S potential. At the time when the signal line SL is set at the reference voltage Vofs again and the sampling transistor T1 is turned ON, if the potential of the source S is not greater than Vofs−Vth, it is possible to perform the threshold-voltage correction operation again. In this embodiment, it is possible to freely determine a threshold-voltage correction time, and thus to completely perform the threshold-voltage correction operation.

Figure 13:
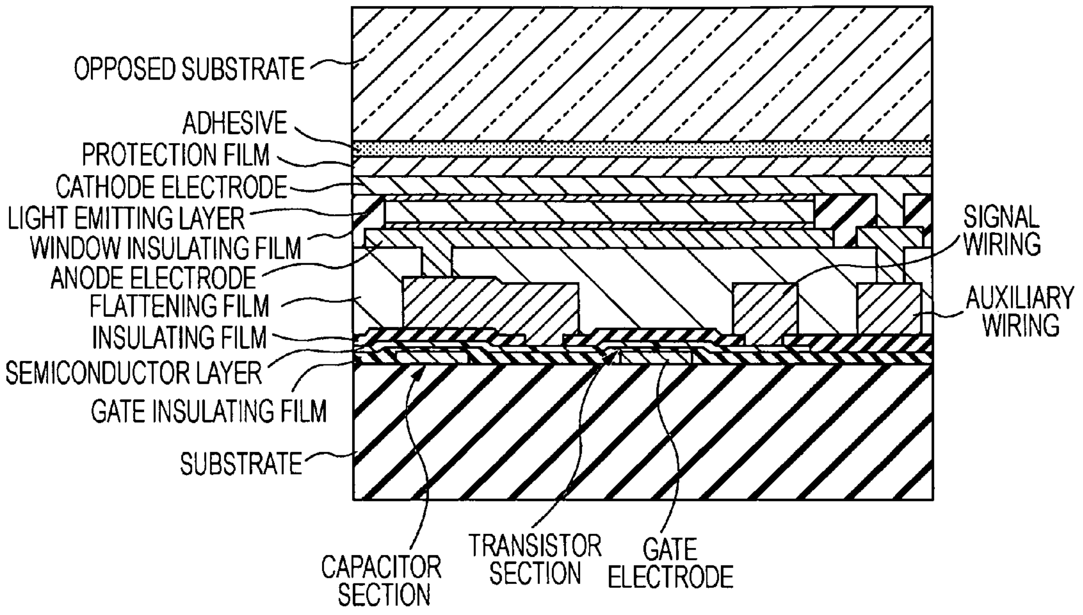
FIG. 13 is a sectional view illustrating a device configuration of a display apparatus according to the present invention.

A display apparatus according to the present invention has a thin-film device configuration as shown in FIG. 13. This figure schematically shows a sectional structure of a pixel formed on an insulating substrate. As shown in the figure, the pixel includes a transistor section (one TFT is shown for example in the figure) including a plurality of thin-film transistors, a capacitor section, such as a holding capacitor, etc., and a light emitting section, such as an organic EL device, etc. The transistor section and the capacitor section are formed on the substrate by a TFT process, and a light emitting section, such as an organic EL device, etc., is laminated thereon. A transparent opposed substrate is attached by adhesive thereon to form a flat panel.

Figure 14:
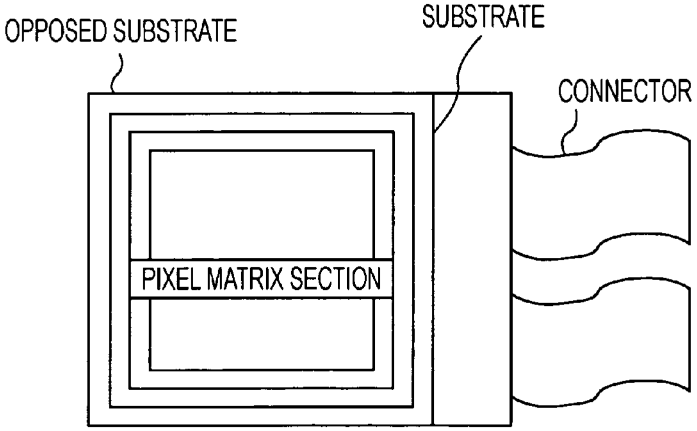
FIG. 14 is a plan view illustrating a module configuration of a display apparatus according to the present invention.

A display apparatus according to the present invention includes a flat modular-shaped display as shown in FIG. 14. For example, a display array section formed by integrating pixels in a matrix, each of the pixels including an organic EL device, a thin-film transistor, a thin-film capacitor, etc., is disposed on an insulating substrate, adhesive is provided so as to surround the pixel array section (pixel matrix section), and an opposed substrate, such as a glass, etc., is attached to produce a display module. A color filter, a protection film, a light blocking film, etc., may be disposed as necessary on this transparent opposed substrate. The display module may be provided with, for example, a FPC (Flexible Print Circuit) as a connector for externally inputting and outputting a signal, etc., to and from the pixel array section.

A display apparatus according to the present invention, as described above, is a flat panel in shape. It is possible to apply the display apparatus to the displays of electronic systems in various fields, for example, a digital camera, a notebook-sized personal computer, a mobile phone, a video camera, and the like, in order to display images or videos that are input into the electronic systems or generated by the electronic systems. In the following, examples of the electronic system to which such a display apparatus is applied are shown.

Figure 15:
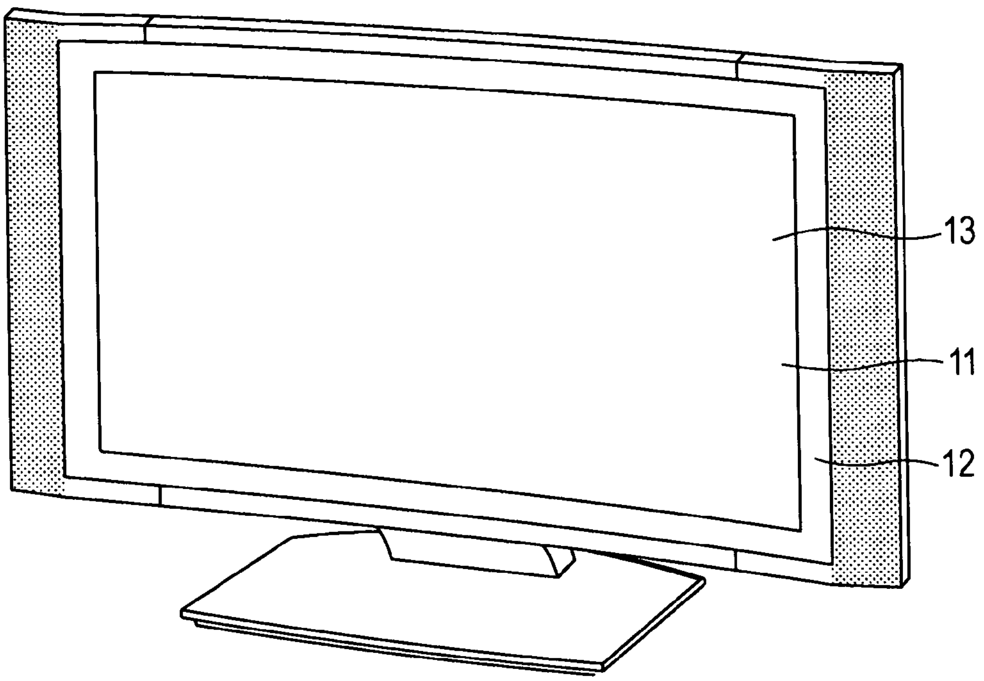
FIG. 15 is a perspective view illustrating a television set including a display apparatus according to the present invention.

FIG. 15 is a television to which the present invention is applied. The television includes a video display screen 11, including a front panel 12, a filter glass 13, etc., and is produced by using a display apparatus of the present invention as the video display screen 11.

Figure 16:
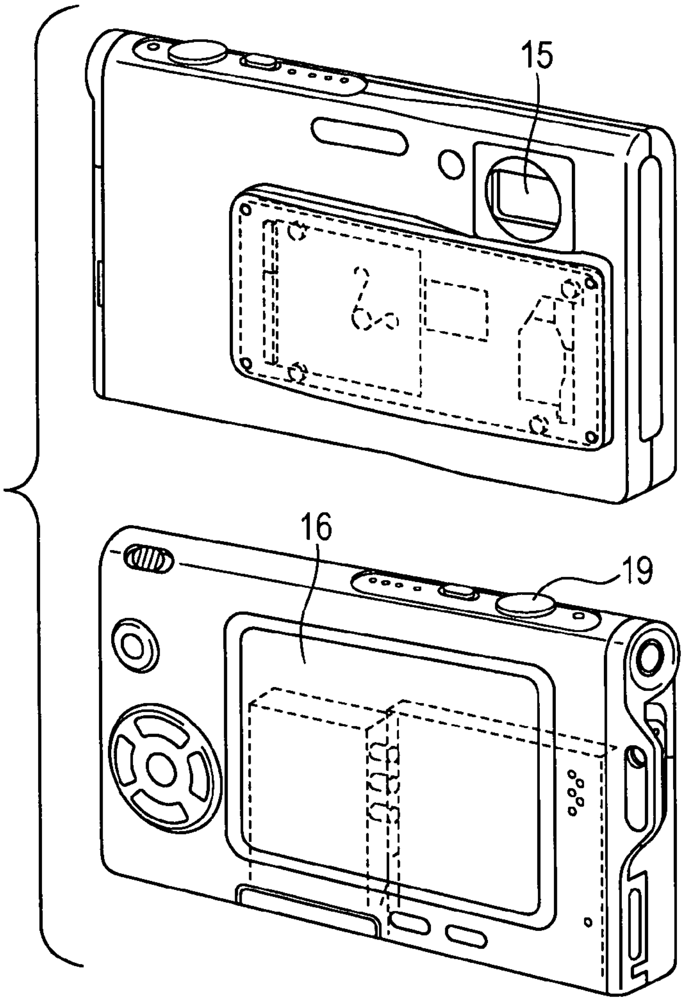
FIG. 16 is a perspective view illustrating a digital still camera including a display apparatus according to the present invention.

FIG. 16 illustrates a digital camera to which the present invention is applied. The upper part is a front view, and the lower part is a rear view. This digital camera includes a capturing lens, a light emitting section 15 for a flash, a display section 16, a control switch, a menu switch, a shutter 19, etc., and is produced by using a display apparatus of the present invention as the display section 16.

Figure 17:
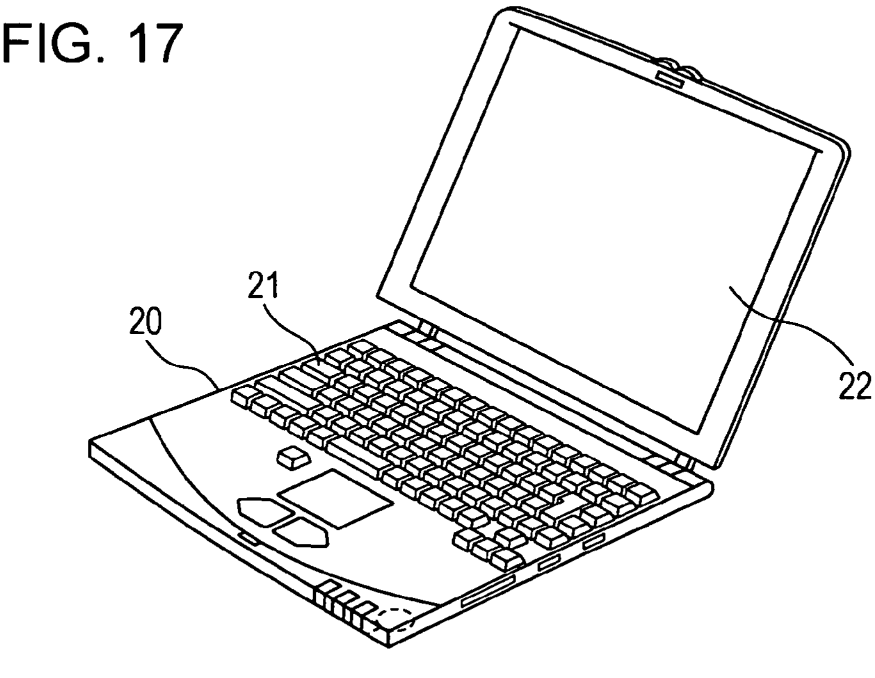
FIG. 17 is a perspective view illustrating a notebook-sized personal computer including a display apparatus according to the present invention.

FIG. 17 illustrates a notebook-sized personal computer to which the present invention is applied. A main unit 20 includes a keyboard 21, which is operated when characters, etc., are input, and the cover of the main unit which includes a display section 22 displaying images, and is produced by using a display apparatus of the present invention as the display section 22.

Figure 18:
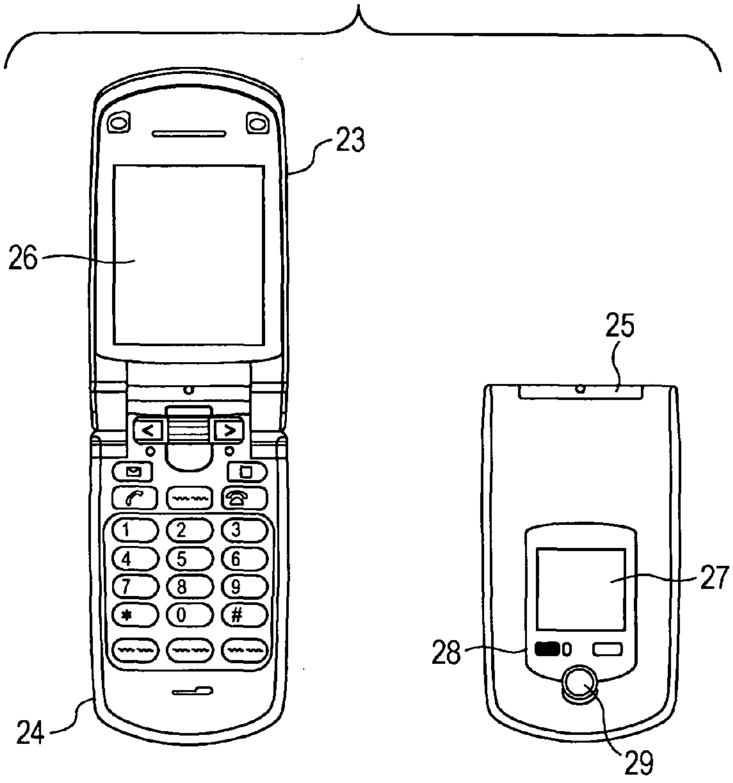
FIG. 18 is a schematic diagram illustrating a mobile terminal apparatus including a display apparatus according to the present invention.

FIG. 18 illustrates a mobile terminal apparatus to which the present invention is applied. The left part shows an open state, and the right part shows a closed state. This mobile terminal apparatus includes an upper case 23, a lower case 24, a connecting part (here, a hinge part) 25, a display 26, a subdisplay 27, a picture light 28, a camera 29, etc., and is produced by using a display apparatus of the present invention as the display 26 and the subdisplay 27.

Figure 19:
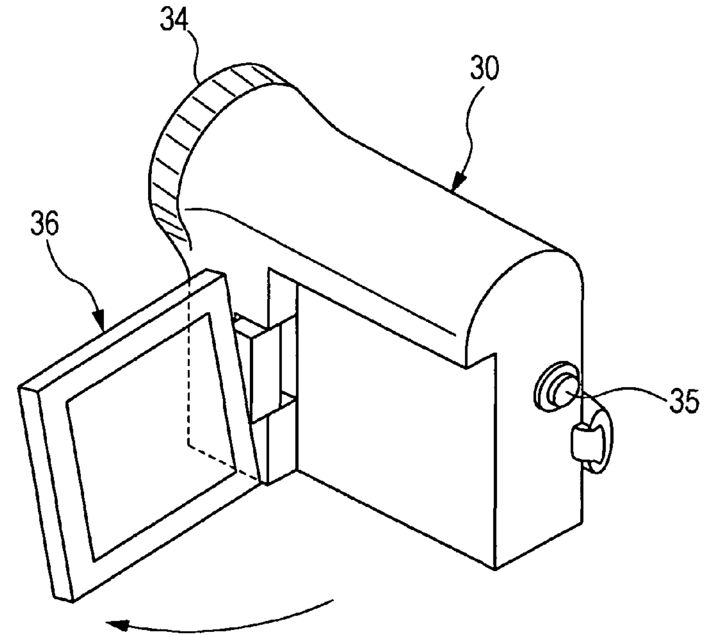
FIG. 19 is a perspective view illustrating a video camera including a display apparatus according to the present invention.
Figure 20:
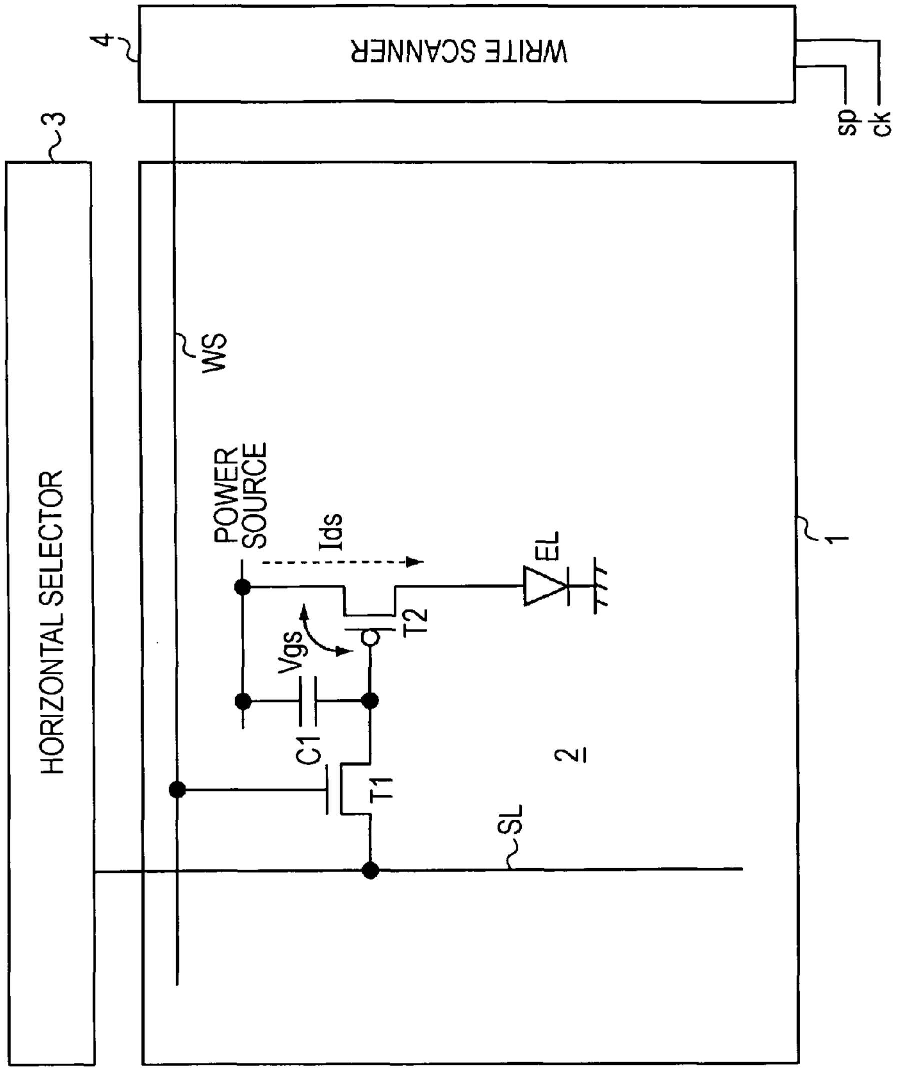
FIG. 20 is a circuit diagram illustrating an example of a display apparatus of the related art.
Figure 21:
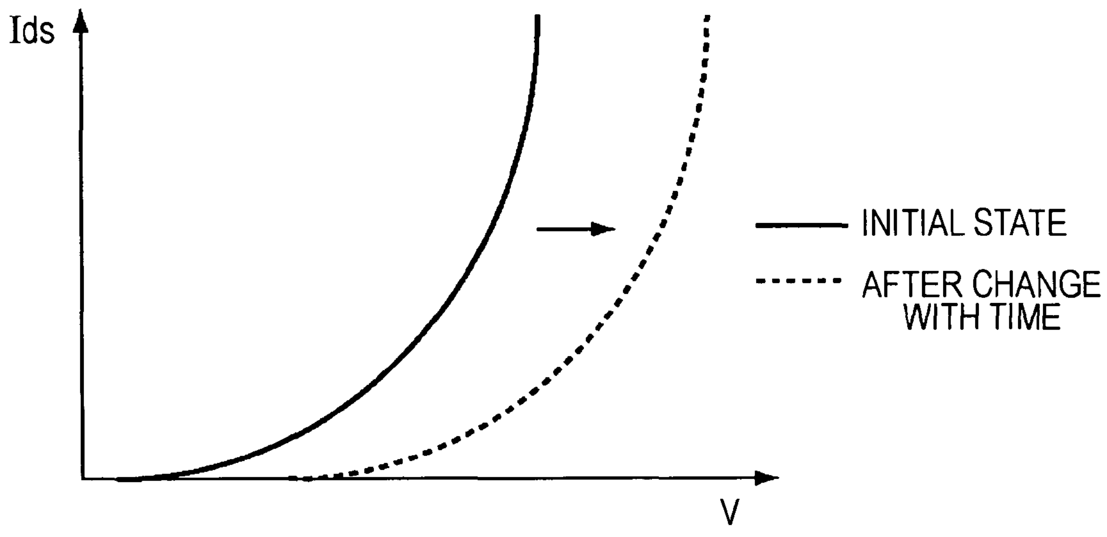
FIG. 21 is a graph showing a problem of a display apparatus of the related art.
Figure 22:
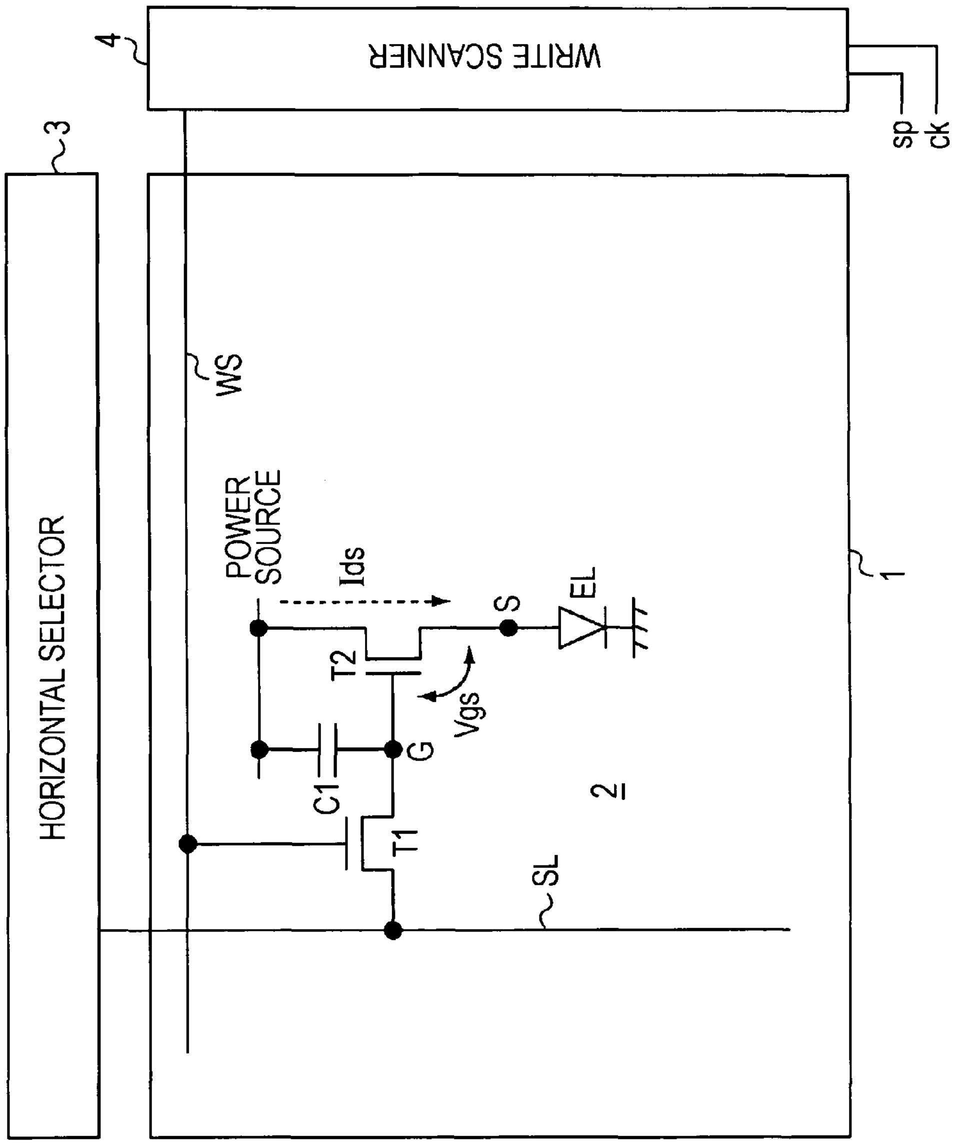
FIG. 22 is a circuit diagram illustrating another example of a display apparatus of the related art.

FIG. 19 illustrates a video camera to which the present invention is applied. The video camera includes a main unit 30, a lens 34 for capturing an object on the side surface facing front, start/stop switch 35 at shooting time, a monitor 36, etc., and is produced by using a display apparatus of the present invention as the monitor 36.

It should be understood by those skilled in the art that various modifications, combinations, subcombinations and alterations may occur depending on design requirements and other factors insofar as they are within the scope of the appended claims or the equivalents thereof.

What is claimed is:

1. A display apparatus comprising:

a pixel array section; and a drive section configured to drive the pixel array section, wherein the pixel array section includes a row of first scanning lines and second scanning lines, a column of signal lines, and pixels in a matrix, each of the pixels respectively disposed at intersections of the first scanning lines and the signal lines, the drive section being configured to output control signals to the row of first scanning lines and second scanning lines, respectively, to perform line progressive scanning on the pixels for each row, and to supply a signal potential of a video signal and a reference potential to a column of signal lines in synchronism with the line progressive scanning, wherein at least one of the pixels includes a light emitting device, a sampling transistor, a driving transistor, a switching transistor, and a holding capacitor, the sampling transistor having a control terminal connected to the first scanning line and a pair of current terminals, one of the current terminals being connected to the signal line, and the other of the current terminals being connected to a control terminal of the driving transistor, the driving transistor having a pair of current terminals, one of the current terminals being connected to a power source line, and the other of the current terminals being connected to the light emitting device, the switching transistor having a control terminal connected to the second scanning line and a pair of current terminals, one of the current terminals being connected to a fixed potential, and the other of the current terminals being connected to the other of the current terminals of the driving transistor, and the holding capacitor having one terminal connected to the control terminal of the driving transistor and the other terminal connected to the other of the current terminals of the driving transistor, wherein the sampling transistor passes a current in accordance with the control signal supplied from the first scanning line, and samples a signal potential of a video signal supplied from the signal line to hold the signal potential in the holding capacitor, the driving transistor causes a drive current to flow through the light emitting device to change the light emitting device to a luminous state in accordance with the held signal potential supplied by the current from the power source line, and the control signal is supplied from the second scanning line to the control terminal of the switching transistor to cause the switching transistor to become ON, which concurrently causes the light emitting device to enter a non-luminous state prior to the sampling of the video signal, wherein during the sampling of the video signal, the control signal is ceased to be supplied to the control terminal of the switching transistor.

2. The display apparatus according to claim 1, wherein the light emitting device includes an anode and a cathode, the anode is connected to the other of the current terminals of the driving transistor, the cathode is connected to a predetermined cathode potential, and the fixed potential to which one of the current terminals of the switching transistor is connected is set to be lower than the cathode potential.

3. The display apparatus according to claim 1, wherein the drive section includes threshold-voltage correction means in order to control the first and the second scanning lines, and a signal line to perform a correction operation writing a voltage corresponding to a threshold voltage of the driving transistor included in each pixel into the holding capacitor, thereby canceling variations of the threshold voltage among the pixels.

4. The display apparatus according to claim 3, wherein the threshold-voltage correction means repeats the correction operations separately in a plurality of horizontal cycles preceding sampling of the video signal.

5. The display apparatus according to claim 3, wherein the threshold-voltage correction means sets the signal line at the reference voltage, and turns ON the sampling transistor to set the control terminal of the driving transistor to the reference voltage, at the same time, turns ON the switching transistor to set the other of the current terminals of the driving transistor to a fixed potential lower than the threshold voltage with respect to the reference voltage, and then turns OFF the switching transistor to write a voltage corresponding to the threshold voltage of the driving transistor into the holding capacitor.

6. The display apparatus according to claim 1, wherein the control scanner outputs a control signal having a predetermined time width onto the first scanning line in order to make the sampling transistor conductive in a time period when the signal line is at the signal potential, thereby causing the holding capacitor to hold the signal potential and correcting the signal potential for mobility of the driving transistor.

7. The display apparatus according to claim 1, wherein the control scanner makes the sampling transistor nonconductive to electrically cut off the control terminal of the driving transistor from the signal line at a point in time when the signal potential is held in the holding capacitor, and thus a potential variation of the control terminal follows a potential variation of the other of the current terminals of the driving transistor, thereby maintaining a voltage between the two terminals to be constant.

8. A method of driving a display apparatus, that includes a pixel array section, and a drive section configured to drive the pixel array section, wherein the pixel array section includes a row of first scanning lines and second scanning lines, a column of signal lines, and pixels in a matrix, each of the pixels respectively disposed at intersections of the first scanning lines and the signal lines, the drive section being configured to output control signals to the row of first scanning lines and second scanning lines, respectively, to perform line progressive scanning on the pixels for each row, and to supply a signal potential of a video signal and a reference potential to a column of signal lines in synchronism with the line progressive scanning, wherein at least one of the pixels includes a light emitting device, a sampling transistor, a driving transistor, a switching transistor, and a holding capacitor, the sampling transistor having a control terminal connected to the first scanning line and a pair of current terminals, one of the current terminals being connected to the signal line, and the other of the current terminals being connected to a control terminal of the driving transistor, the driving transistor having a pair of current terminals, one of the current terminals being connected to a power source line, and the other of the current terminals being connected to the light emitting device, the switching transistor having a control terminal connected to the second scanning line and a pair of current terminals, one of the current terminals being connected to a fixed potential, and the other of the current terminals being connected to the other of the current terminals of the driving transistor, and the holding capacitor having one terminal connected to the control terminal of the driving transistor and the other terminal connected to the other of the current terminals of the driving transistor, wherein the method comprises:

passing, by the sampling transistor, a current in accordance with the control signal supplied from the first scanning line, and sampling a signal potential of a video signal supplied from the signal line to hold the signal potential in the holding capacitor, causing, by the driving transistor, a drive current to flow through the light emitting device to change the light emitting device to a luminous state in accordance with the held signal potential supplied by the current from the power source, and supplying the control signal from the second scanning line to the control terminal of the switching transistor to cause the switching transistor to become ON, which concurrently causes the light emitting device to enter a non-luminous state prior to the sampling of the video signal, wherein during the sampling of the video signal, the control signal is ceased to be supplied to the control terminal of the switching transistor.

9. An electronic system including the display apparatus according to claim 1.

* * * * *